(12) United States Patent
Levola (10) Patent No.: US 7,542,214 B2
(45) Date of Patent: Jun. 2, 2009

(54) IMAGING SYSTEM WITH A PRISM HAVING ADJUSTABLE NUMBER OF REFLECTIONS

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/557,451

(22) PCT Filed: Jun. 17, 2004

(86) PCT No.: PCT/FI2004/050095

§ 371 (c)(1),
(2), (4) Date: Nov. 18, 2005

(87) PCT Pub. No.: WO2004/111697

PCT Pub. Date: Dec. 23, 2004

(65) Prior Publication Data

US 2006/0279857 A1    Dec. 14, 2006

(30) Foreign Application Priority Data

Jun. 17, 2003    (FI)    ................... 20035097

(51) Int. Cl.
*G02B 15/02*    (2006.01)
(52) U.S. Cl. .................... 359/678; 359/832
(58) Field of Classification Search ......... 359/665–667, 359/832; 396/112
See application file for complete search history.

(56) References Cited

U.S. PATENT DOCUMENTS

| 3,606,523 | A | * | 9/1971 | Tayler | ............... 359/665 |
| 4,701,021 | A |   | 10/1987 | Le Pesant et al. | |
| 4,784,479 | A | * | 11/1988 | Ikemori | ............... 359/666 |
| 6,040,949 | A |   | 3/2000 | Ohno | |
| 6,318,857 | B1 | * | 11/2001 | Shirayanagi | ............... 351/41 |
| 6,342,975 | B1 |   | 1/2002 | Yamanashi | |
| 6,369,954 | B1 |   | 4/2002 | Berge et al. | |
| 6,437,925 | B1 | * | 8/2002 | Nishioka | ............... 359/726 |
| 2002/0080920 | A1 |   | 6/2002 | Prins et al. | |
| 2002/0118464 | A1 | * | 8/2002 | Nishioka et al. | ............... 359/642 |
| 2003/0107789 | A1 | * | 6/2003 | Hishioka | ............... 359/223 |

(Continued)

FOREIGN PATENT DOCUMENTS

JP    07043592 A   *   2/1995

(Continued)

*Primary Examiner*—Alessandro Amari
*Assistant Examiner*—Mark Consilvio
(74) *Attorney, Agent, or Firm*—Alfred A. Fressola; Ware, Fressola, Van Der Sluys & Adolphson LLP (57) ABSTRACT

The invention relates to a small-size and light-weight optical system with an adjustable focal length. The invention relates to a method and system comprising an image plane on which there is formed an image of the target observed by the optical system, a first optical component with an adjustable focal length, and a prism with an optical path that is adjustable to correspond to the focal length adjusted for the first optical component. By means of the optical system according to the invention, there is formed an image of the target under observation, located at the distance of the focal length of the first optical component, on the image plane so that the first optical component, the prism and the image plane remain permanently in place in relation to each other.

36 Claims, 2 Drawing Sheets

U.S. PATENT DOCUMENTS

2003/0179464 A1 * 9/2003 Amanai .................. 359/685
2004/0218283 A1 * 11/2004 Nagaoka et al. ............ 359/665

FOREIGN PATENT DOCUMENTS

| JP | 08211208 A * | 8/1996 |
| JP | 2001-272646 | 10/2001 |
| JP | 2002303783 | 10/2002 |

* cited by examiner

IMAGING SYSTEM WITH A PRISM HAVING ADJUSTABLE NUMBER OF REFLECTIONS

CROSS REFERENCE TO RELATED APPLICATIONS

This application is for entry into the U.S. national phase under §371 for International Application No. PCT/FI2004/050095 having an international filing date of Jun. 17, 2004, and from which priority is claimed under all applicable sections of Title 35 of the United States Code including, but not limited to, Sections 120, 363 and 365(c), and which in turn claims priority to Finnish patent application 20035097 filed on Jun. 17, 2003.

FIELD OF THE INVENTION

The present invention relates to a small-size and light-weight optical system with an adjustable focal length.

BACKGROUND OF THE INVENTION

Optical systems are typically compiled of several optical elements. In optical elements and in systems compiled thereof, there always occur imaging errors. In optical planning, the aim is always the best possible result from the point of view of the end application. A general aim is that an object point under observation could be imaged as an image point. For instance in a camera and other optical systems designed for image reproduction, it is necessary to take into account, in addition to the features of a possible display device, also the resolution of the human eye, when the required image accuracy and pixel size are being iterated. In general, resolution means the capacity of a system to distinguish details. Resolution is typically expressed as the shortest angular distance between two points that are only just distinguished as two separate points. The resolution of a healthy human eye in favourable conditions is not more than one arc minute.

Typically optical imaging errors are corrected or compensated by suitable combination of various lenses. A lens or a lens combination with a positive focal length is generally called a positive lens. Positive lenses that collect rays are for instance a convex-convex or a piano-convex lens. Respectively lenses that have a negative focal length, i.e. dispersing, concave lenses or lens combinations, are generally called negative lenses. When correcting imaging errors, there is chosen a suitable glass quality, lens thickness and shape, the location of the apertures and the lens coating. Typically when planning an optical system, there is searched an appropriate balance between the different imaging errors, in order to achieve a sufficiently good result in each case.

Often the image quality is better, the larger the number of lenses that is used for producing the image. For instance from the point of image reproduction, an ideal optical system could comprise 20 lenses, because when correctly combined, different glass and lens types mutually compensate their imaging errors. However, if the object is to realize light-weight optics in a small space, the number of lenses must be kept remarkably smaller, which means that the image quality requirements must be cut down. It can be roughly maintained that the performance of an optical system is always better, the larger the number of lenses that it is built of. However, when planning the system, it must also be taken into account that about 5% of light is reflected back from each lens. Apart from the fact that in multi-lens systems luminosity is decreased, systems containing several elements are heavy and expensive. Even if a good image quality is achieved, the size, weight and expenses restrict the applicability and usage of this kind of optics.

A known device where optics are generally used is a camera. A prior art optical solution designed for a small camera is disclosed in the publication U.S. Pat. No. 6,342,975. In the lens system, the first and second lens groups are positive, and the third lens group Is negative. The first lens group includes a negative and a positive lens. The second lens group includes an adjustable aperture and a negative and a positive lens. The third lens group includes a positive and a negative lens. When the optics are zoomed from a wide-angle close-up view to a telescopic telephoto view, each of the lens groups moves towards the target end, i.e. towards the first lens group. In addition, the distance between the first and second lens group grows, and the distance between the second and third lens group is shortened. This arrangement, however, contains a large number of single optical elements, which makes the optical arrangement expensive. Moreover, when the number of lenses increases, the optical system requires more space, and it becomes heavier. The mutual positioning of the optical elements and the realization of their mechanical mobility as well as their control require precision.

Figure 1:
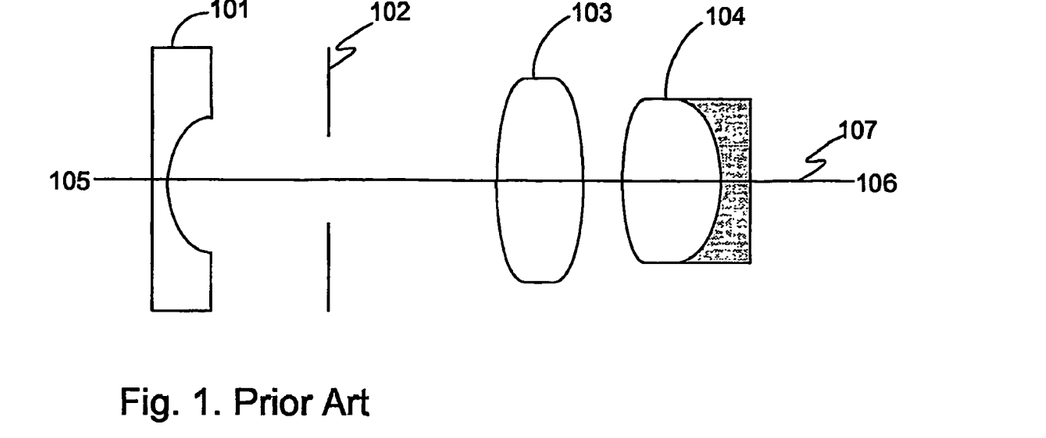
FIG. 1 illustrates an optical system according to the prior art.

Another simple lens system suited in a small camera is introduced in the publication U.S. Pat. No. 6,040,949. The arrangement aims in that both the camera and its optical system can be realized in a small size, as small as possible. The optical system includes a lens system, and the three lens groups thereof are illustrated in FIG. 1 representing the prior art. The first lens group 101 in FIG. 1 constitutes a plano-concave lens, and it has a negative refractive power. The second lens group 103 in FIG. 1 constitutes a convex-convex lens, and it has a positive refractive power. The third lens group 104 in FIG. 1 constitutes combined convex-convex and plano-concave lenses, and the refractive power of the third lens group 104 is positive. The target under observation that should be pictured, illustrated in FIG. 1, is located on the left side 105 of the lens group 101, and an image of the target is formed on the right side 106 of the lens system. The optical axis 107 runs through the center point of the lenses. Between the first lens group 101 and the second lens group 103, there is an adjustable aperture 102. When focusing the image, i.e. when zooming a certain part of the view, the locations of the second lens group 103 and of the third lens group 104 are changed along the optical axis. The described arrangements advantageously include only 4 single lenses.

In the above cited publications, the lens groups are moved along the optical axis in order to adjust the focal length of the system. The reciprocal moving of lenses is a very typical way to adjust the optical properties of the system, such as focal length, magnification, focusing or angular field. Another known way, particularly used in cameras, to adjust the focal length or the refractive index is to replace the lens by a different type of lens. This can be realized for instance so that in front of the camera lens, there is installed a disc containing different types of lenses that can be changed in order to picture the chosen target as accurately as possible. The mechanical moving of the lenses or of the disc always requires space, which is minimal in small devices. In addition, the mechanical adjustments must be carried out accurately both in the installation step and when the device is being used, in order to arrange the optical components precisely at the right position in relation to the optical axis and to each other.

A typical prior art optical system suited in small cameras is a system with only one focal length, in which case the focal length is not adjusted mechanically at all. In this arrangement, the distance from the target to the camera falls within a fairly limited range if a good image quality should be maintained. This means that the image only has a high quality within a given average range, but a sharp image cannot be made of targets located at a close or distant range. Consequently the possibility to adjust the focal length is a desired feature in optical applications and in devices utilizing them.

BRIEF SUMMARY OF THE INVENTION

The objective of the invention is to realize an improved, small-size, compact, light-weight optical system with an adjustable focal length.

The objectives are realized by producing a compact optical system containing a first optical component with a focal length that can be adjusted for various distances, and a second optical component, where the optical path of the ray that passes therethrough is adjustable, so that the optical length of the radiation passing through the second optical component corresponds to the focal length of the first optical component. In addition, the objectives are realized so that the optical components are installed in place in a stationary manner, and the stationary positions of the components remain the same as the optical features of the components are changed.

The invention is characterized by what is set forth in the independent claims. Advantageous embodiments of the invention are described in the dependent claims.

According to an advantageous embodiment of the invention, there is realized a small-size, adjustable optical system provided with an image plane, on which there is formed an image of the target observed by the optical system, a first optical component with an adjustable focal length, and a prism, where the optical path of the ray passing through said prism is adjustable to be such that it corresponds to the focal length of the first optical element. According to an advantageous embodiment of the invention, on the image plane there is formed an image of the observed target located at the focal length of the first optical element, so that the first optical component, the prism and the image plane are installed in a stationary fashion with respect to each other.

The optical elements of an optical system according to an advantageous embodiment of the invention comprise a variable-shape lens and a prism provided with an air gap. The optical properties of the lens are preferably adjusted by changing the shape of the lens. According to an advantageous embodiment of the invention, the lens need not be shifted or moved from its stationary position in order to adjust the focal length. When the variable-shape lens is thick, it has a short focal length. In that case the target under observation is located near, and the angle of view is wide. When the lens is thin and has a long focal length, the optics serve as a so-called tele-objective. The target area under observation is located fairly far from the lens, and the view is typically narrow. Thus a thin lens with a long focal length operates in a telescopic fashion.

In order to make on the image plane a sharp image of each point of the target surface under observation, the rays passing through the lens form a image point on the image plane that is located at the focal length from the lens. Because the focal length of the lens can according to the invention be adjusted, it is respectively necessary also to adjust the length traveled by the radiation that passed through the lens in order to make on the image plane a sharp image of the target under observation. According to an advantageous embodiment, the length that the ray has passed through the prism, the so-called optical path, corresponds to the focal length of the lens, so that the length passed by the rays from the target plane to the lens center is as long as the length passed by the rays from the lens center to the image plane. Instead of moving the lens as in the prior art in order to lengthen the optical path, the distance traveled by the rays is according to an advantageous embodiment of the invention adjusted by means of reflections taking place in the prism. In the prism, the Incoming ray proceeds directly forward, without reflecting from the boundary surfaces, wherefore the optical path traveled by the ray in the prism is short. When the focal length of the lens grows, the optical path traveled by the ray in the prism can be extended, so that multiple reflections are created in the prism before the ray meets the image plane. Thus the optical path traveled by the radiation in the prism can be adjusted without mechanically moving or shifting the optical element from its stationary location.

In an advantageous embodiment of the invention, in order to adjust the optical path traveled by the ray, there is used a prism provided with an air gap. When the lens is thick and the focal length is short, the air gap of the prism is filled with a liquid having a refractive index that at a certain accuracy is the same as the refractive index of the prism material. Reflections do not take place in the prism, but the radiation proceeds through it onto the image plane in a nearly straightforward fashion. When the system is used as a tele-objective, the lens is thin and its focal length is long. Now, according to an advantageous embodiment, the prism gap is emptied of the liquid, after which the gap left in between the prism planes is filled with air. Because the refractive index of air is different from that of the prism material, the rays are reflected at the boundary surface of the prism material and air. In the prism, the reflected rays further meet other boundary surfaces that can be coated with reflecting films. Consequently several reflections take place, and as a result, the optical path of the ray entering the prism is extended. By means of the reflections, the optical path and thereby the focal length can be increased by means of so-called Pechan prisms by more than three times, and with some other types of prisms even by nearly six times.

By means of the optical system according to an advantageous embodiment of the invention, it is possible to make sharp images of targets located at different distances, i.e. to adjust the distance between the target and the camera. This adjusting cannot be carried out by the single-focal-length optics typically used in small cameras that are installed for example in telephone devices. By using the apparatus and method according to the advantageous embodiment of the invention, there are obtained pictures with a better quality from both close and long range, because the prior art fixed-focal-length optics are only suited to be used in a limited middle region. According to an advantageous embodiment of the invention, the focal distance is adjustable to be short for shooting close-range targets, and to be long for representing long-range targets. Advantageously the angular field in a close-up view is wide, and a long-range view is shot in a telescopic fashion, with a narrower angular field. In an optical system according to an advantageous embodiment of the invention, the adjustments between a wide and a narrow angular field, between a close-up view and a long-range view are swift. With multilens camera objectives, where the adjustment is carried out by moving lenses or lens groups, the desired change in the angular field is achieved much slower than when modifying the optical properties of the lens by changing its shape and by filling the prism air gap with liquid or by emptying it of the liquid. In addition, an optical system according to an advantageous embodiment of the invention that produces a good picture quality is light-weight and compact in comparison with multilens camera objectives, wherefore it is suited even in small devices.

BRIEF DESCRIPTION OF THE SEVERAL VIEWS OF THE DRAWINGS

The invention is described in more detail below with reference to the appended drawings, where.

DETAILED DESCRIPTION OF THE INVENTION

Figure 2:
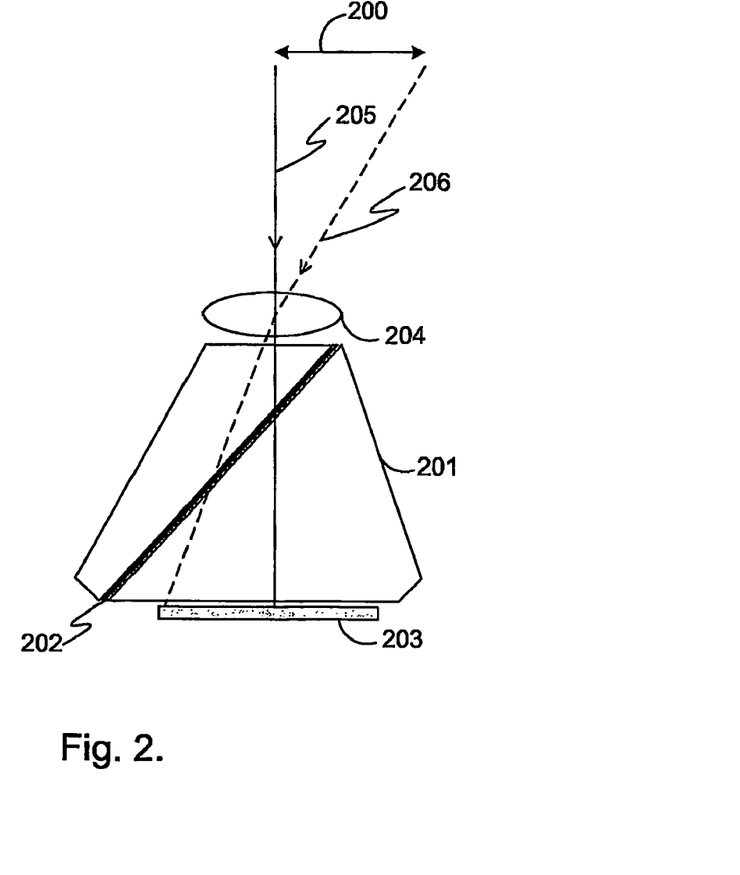
FIG. 2 illustrates an optical system according to an advantageous embodiment of the invention.

FIG. 2 shows an optical system according to an advantageous embodiment of the invention, the first optical component whereof is a thick lens 204 with a short focal length, and the second optical component is a prism 201. The prism 201 is provided with a gap 202 that is filled with a filling agent having the same refractive index as the prism. Thus, in the prism 201 there is achieved for the ray passing therethrough an optical path corresponding to the focal distance of the lens 204, and the target located at the focal length distance from the lens 204 is focused on the image plane 203.

In the embodiment illustrated in FIG. 2, the lens 204 is a collecting, positive, thick lens. The focal length of the lens is fairly short, wherefore the target 200 under observation, which advantageously is located at the focal length distance, is relatively near the lens. The arrow 200 illustrates the target surface between the edge ray 206 and the center ray 205, which thus is half of the real target surface left between two edge rays. The target surface 200, i.e. the view pictured in this embodiment is wide. In addition, in FIG. 2 there is illustrated an image plane 203, on which there is formed an image of the target observed by the optical system. Here the term image plane generally means a location or a surface on which there is formed an image of the target under observation by means of the optical system according to the invention. The image plane does not necessarily have to be a plane. In a prism 201 according to an advantageous embodiment of the invention, there is provided a planar gap 202, the width whereof is of the order of a few micrometers. Advantageously the gap runs through the prism, from one angle to the opposite angle, forming a plane so that all rays passing through the prism pass through the gap. In the advantageous embodiment illustrated in FIG. 2, the gap 202 is filled with liquid having a refractive index that with a certain accuracy is the same as the refractive index of the prism material. In that case the refractive properties of the prism correspond to those of a uniform prism without a gap. The radiation, which generally is light radiation, penetrates said prism 201 provided with a gap in the same fashion as it would penetrate a homogeneous prism.

The passage of the rays emitted from the object under observation is illustrated by following the passage of the center ray 205 and of the edge ray 206. The passage of the center ray 205 from the target plane 200 through the optical system onto the image plane 203 is depicted by a uniform line. The edge ray 206 is depicted by a dotted line. The center ray 205 enters the optical system via its center point, along the optical axis. In this embodiment, the center ray 205 passes through the center point of the lens 204 located on the optical axis. The positive, convex lens 204 collects the rays emitted from the image plane and directs them further to the prism 201. The distance of the image plane 203 from the lens is determined according to the focal length of the lens. Advantageously the target surface or plane under observation is located at the focal length distance from the lens. In the prism 201, the rays are refracted directly on the image plane 203, where there is formed an image point corresponding to that point of the target plane 200 from which the ray was emitted. The edge ray 206 hits the lens 204 in an inclined way. The lens collects the rays, and they are refracted in the prism 201, so that the edge ray of the target plane 200 is pictured at the opposite edge of the image plane 203. The optical path traveled by the rays in the prism 201 corresponds to the focal length of the lens 204. Of one point of the target plane 200, there is advantageously formed one image point on the image plane 203.

In the embodiment illustrated in FIG. 2, the target plane 200, i.e. the view reproduced by the optical system, is wide. In other words, the system has a wide angular field. A wide angular field is typically achieved when the focal length of the optical system is relatively short.

Figure 3:
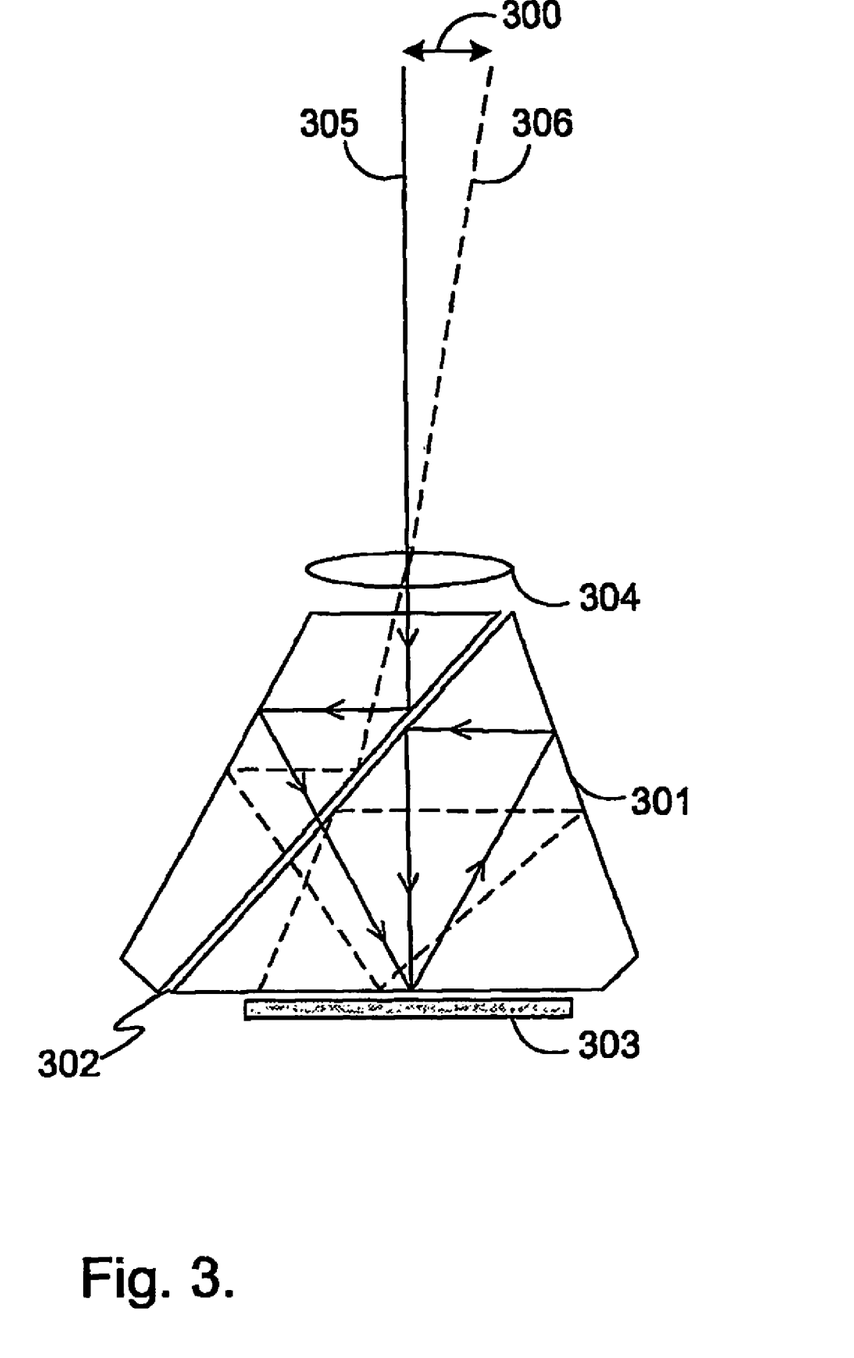
FIG. 3 illustrates an optical system according to an advantageous embodiment of the invention.

FIG. 3 illustrates an optical system according to another advantageous embodiment of the invention, which system contains corresponding optical components as the embodiment illustrated in FIG. 2. In the advantageous embodiments of the invention the first optical component is a variable-shape lens, in which case its optical properties, here advantageously the focal length, can be adjusted by changing the shape of the lens, typically its curvature. The first optical component may also be a lens combination composed of several single lens elements. Advantageously at least one lens elements is a variable-shape lens. The employed second optical component is a prism, and the optical path of the rays passing through said prism can be adjusted so that the optical path traveled by the rays in the prism corresponds to the adjustable focal length of the lens in each case. In the prism, the optical path of the rays passing therethrough is adjusted advantageously by adjusting in the prism gap the total reflections taking place in the prism. Advantageously the optical elements of the invention are not shifted, but they have stationary positions, and their optical properties can be changed without moving them.

In the embodiment of FIG. 3, the optical system is used for shooting a long-range view. The first optical component is a thin, variable-shape lens 304 with a long focal length. The second optical component is a prism 301 provided with an air-filled gap 302. The refractive index of air is different from that of the prism 301, and the optical path traveled by the ray in the prism 301 corresponds to the focal length of the lens. The image of the target under observation is formed on the plane 303.

In FIG. 3, the focal length of the optical system is long, which means that the angular field is small and the view, i.e. the target area pictured on the image plane is fairly limited. The target area 300 formed in between the center ray 305 and the edge ray 306 illustrated in the drawing is half of the real target area formed in between the edge rays. Typically the arrangement according to the described embodiment is used as a tele-objective, when imaging distant targets. The view more or less corresponds to that of a telescope: distant targets on a relatively small area are focused well on the image plane. In this embodiment, there is typically used a thin lens 304 with a long focal length. A thin lens here means a lens where the thickness is small in comparison with the radius of the spherical surface thereof. A thin lens is suited to be used when the incoming rays are nearly parallel with the optical axis, i.e. they have a small angle of incidence. When the angle of incidence is small, as in FIG. 3, also the rays enter the optical system at a small angle of incidence.

In the embodiment illustrated in FIG. 3, the gap 302 of the prism 301 is emptied of the filling agent, i.e. it is filled with air. In the embodiment illustrated in FIG. 3, the passage of the center ray 305 from the target plane 300 through the optical system onto the image plane 303 is depicted by a uniform line. The edge ray 306 is depicted by a dotted line. The center ray 305 passes along the optical axis running via the center point of the system to the prism, where it is reflected from the edge of the air gap 302 to the opposite edge of the prism 301. From the edge of the prism 301, the refracted ray meets the air gap 302 at a sufficiently large angle in order to penetrate the air gap 302, and then the ray proceeds to that edge of the prism that faces the image plane 303. The angle of incidence to the edge facing the image plane 303 is, however, so small that the ray is again reflected onto the adjacent side of the prism 301 and further to the edge of the air gap 302, from where the ray is refracted onto the image plane 303, thus forming an image point there.

The edge ray 306 passes to the first component of the optical system, which here is the lens 304. The positive lens 304 collects the rays and directs then onto the prism 301 at a given angle of incidence. The edge ray 306 is refracted from the edge of the air gap 302 of the prism 301 onto the opposite side of the prism 301. From the side of the prism 301, the refracted ray enters the air gap 302 in a nearly perpendicular position, so that a total reflection does not take place anymore, but the ray penetrates the air gap 302 along a straight line to that side of the prism 301 that faces the image plane 303. From here, the edge ray 306 Is reflected to the adjacent side of the prism 301, whereafter it proceeds via that edge of the prism 301 that faces the air gap 302 and is reflected from there onto the image plane 303, where it forms an image point.

In this advantageous embodiment, the light entering the prism 301 is refracted several times in the prism 301 before it reaches the image plane 303. The optical path traveled by the light in the prism 301 is advantageously even 3.8-fold in comparison with the path traveled by light in a homogeneous prism. Generally the optical path traveled by rays in the prism 301 is extended, when total reflections are created on the boundary surface of the gap and the prism. Total reflections are created when the gap filling agent is chosen to have a suitable refractive index, and the rays enter it at a given angle. Typically the employed totally reflecting gap filling agent is air, which has a different refractive index than the prism material.

From the point of view of the invention it is advantageous that the optical properties of the lens can be changed without changing the lens itself, or without moving it along the optical axis or in relation to other optical elements or image/target planes. For instance the properties of a variable-shape lens are changed by changing the curvature of the refracting lens surface. Advantageously variable-shape lenses are elastic, so that their diameters can be extended and shortened. From the point of view of the invention, the shape of the refracting lens surface is not essential, and neither is the grinding of the lens. In the optical system according to the invention, there can be applied both a spherical lens as well as for example a ground Fresnell lens. According to an advantageous embodiment, the lens material can be any suitable, permeable and elastic material, such as silicon, other synthetic polymer, rubber, polyethylene or polypropylene. In particular, the lens must be permeable to such wavelengths that are desired to be observed by the system according to the invention, i.e. typically the wavelengths of visible light. Obviously an essential feature is the permeability of the material, which requires that the material absorbs incoming radiation as little as possible, and that the scattering or breaking of incoming rays is minimal.

In an advantageous embodiment of the invention, the employed lens may also be a lens combination, where the lenses forming the combination are preferably permanently connected to each other in a way known as such. The lens may for instance comprise a thin, permeable shell that is filled with an agent, which agent is for example liquid, gas or a gel-like substance. According to an advantageous embodiment of the invention it is essential that the employed lens is highly permeable and elastic.

A change of a few percentages in the diameter changes the refractive capacity and focal length of the lens. Variable-shape lenses generally have relatively short diameters. The changing of the lens shape can be realized for instance so that the elastic lens is evenly stretched at the edges. The lens is thickest in a so-called idle state, and its diameter can be evenly stretched; as a consequence, the lens becomes thinner, and its optical properties are changed. One way for realizing the changing of the lens diameter Is to install extremely small-size microelements evenly on the circumference of the lens. On the basis of control signals obtained from the control unit, each element causes a mechanical compressive or tensile effect in order to move the lens circumference inwards or outwards from the center point of the lens. The elements according to another advantageous embodiment are annular-shaped electrodes with various sizes, and they are placed concentrically with respect to the center point of the lens. The controlling of these microelements can be realized for example electrically, by switching power in them, and by then inducing an electric field in the lens.

According to another advantageous embodiment, the lens may consist of two mutually non-soluble ingredients. For instance in the publication U.S. Pat. No. 6,369,954 B1, there is described a variable-shape lens composed of a first conductive liquid and of second insoluble liquid that is separated at the other edge of the lens, which second liquid is neither mixed nor dissolved in the first conductive liquid, being for instance clear oil. The employed liquids have different refractive indexes. In the lens, there are coupled electrodes that are connected via a switch to a power supply or to earth. The shape of the boundary surface of the liquids constituting the lens is changed by means of the electric field induced over the lens. The shape of the boundary surface can be adjusted for example by conducting the power only to certain electrodes coupled in the lens. Typically, when the power value is alternated between zero and the maximum value, the boundary surface of the substances changes its shape between its two extreme positions. This kind of method is called electrowetting.

The lens according to a third advantageous embodiment is a crystalline doubly refracting lens. The lens consists of doubly refracting crystals with a horizontal refractive index that is different than the vertical refractive index. The crystals in the lens are arranged in a given order, for instance all horizontally, evenly and equidistantly. The crystals are typically turned so that there is induced an electric field over the crystalline lens. By means of the electric field, the horizontal crystals are arranged according to the electric field, for example in a given position, such as at a given angle or in a vertical position, in which case the refractive index of the crystalline lens is changed. Crystalline lenses and the controlling of crystals is described for instance in the publication JP2001272646.

According to an advantageous embodiment of the invention, the optical properties of the prism are modified by changing the optical path traveled by the entering rays in the prism. Advantageously the applied prism is provided with a gap, or the prism is formed of two prisms, where a small gap is formed between the mutually facing sides. The prism according to the advantageous embodiment, provided with a gap, is for example a known Pechan prism. By changing the gap filling agents, according to the refractive index of the filling agent, the entering rays can be controlled to proceed in the prism in a desired way. For instance when it is desirable that the entering ray travels in the prism a length that is as short as possible, the gap filling agent is chosen so that the ray proceeds without refracting and without being reflected, directly through the gap. Now the filling agent is chosen so that its refractive index is the same, or at least with a certain accuracy the same as the refractive index of the prism material. When the optical path should be extended, it is attempted to achieve total reflection from the gap edge back into the original segment of the prism. By means of the created total reflections and other reflections, the optical path of the light passing through the prism can be adjusted to be over threefold. The optical path of light, or more generally of the ray, traveled in the prism is according to an advantageous embodiment of the invention adjusted in the same proportion and in a corresponding fashion as the focal length of the first optical component. The target surface pictured by an optical arrangement according to the advantageous embodiment can be defined even at a distance that is 3.8-fold from the optics, so that a sharp image of the target is obtained on the image plane without having to mechanically move the optical elements, such as the prism, the variable-shape lens or the image plane.

The gap in a prism according to an advantageous embodiment of the invention is very thin. The filling of the gap with a given liquid, and the removing of the liquid from the gap, can be realized in many different ways. According to an advantageous embodiment, in the filling and re-emptying of the gap, there is made use of the capillary phenomenon. Typically the filling of the gap with liquid and the emptying of the gap of the filling agent are controlled by means of an electric field. The prism filling and emptying can also be controlled by means of electrowetting that was mentioned in previous, in the description of the modification of the lens shape. The guiding of the liquid in the narrow gap is described in more detail for example in the publications US 2,002,080, 920 and U.S. Pat. No. 4,701,021.

The adjusting of the focal length of the optical system according to the advantageous embodiment of the invention by modifying the shape of the lens and by changing the filling agent in the prism gap is faster than the adjustments made in the prior art, which always require the moving of the optical elements or optical components made of several elements. In addition, the arrangement according to the invention where the focal length is adjusted fits well within a small space, wherefore it is particularly well suited in small devices, for instance mobile phones. The possibility to adjust the focal length improves the quality of the optics, and light-weight optics are achieved, when the arrangement includes as few optical components as possible, here advantageously only two. For a man skilled in the art it is obvious that the method and arrangement according to the advantageous embodiment of the invention can be technically realized in many different ways, by using various different components and component combinations, without departing from the scope of the invention.

The invention claimed is:

1. An apparatus comprising:
   an image plane, on which there is formed an image of a target, and
   a lens permanently positioned relative to said image plane, wherein the lens has a mechanically adjustable focal length, and
   a prism permanently positioned relative to said image plane and said lens, with an optical path that is adjustable so that it corresponds to the focal length determined for the lens, so that an image of an observed target located at the focal length of the lens is formable on the image plane, wherein the prism is configured to produce an adjustable number of reflections along the optical path through the prism.

2. The apparatus according to claim 1, wherein the lens is a variable-shape lens with a curvature that can be changed in order to adjust the focal length of the lens.

3. The apparatus according to claim 1, wherein the lens is an elastic, variable-shape lens with a diameter that can be changed in order to adjust the focal length of the lens.

4. The apparatus according to claim 1, wherein the lens is made of two materials that are mutually non-soluble, so that the shape of the boundary surface of said materials can be changed in order to adjust the focal length of the lens.

5. The apparatus according to claim 1, wherein the lens contains doubly refracting crystals, the position of said crystals being changeable in order to adjust the focal length of the lens.

6. The apparatus according to claim 1, wherein an electric field is to be induced in the lens in order to adjust the optical properties of the lens.

7. The apparatus according to claim 1, wherein the lens is composed of several elements, at least one of which is a variable-shape lens.

8. The apparatus according to claim 1, wherein the prism is provided with a gap, and that the apparatus comprises means for filling the gap by a filling agent and for emptying the gap of the filling agent in order to adjust the optical path in the prism.

9. The apparatus according to claim 8, wherein the gap of the prism is filled with a liquid filling agent with a refractive index that is the same as the refractive index of the prism in order to minimize the optical path in the prism.

10. The apparatus according to claim 8, wherein the gap of the prism is filled with air as the filling agent in order to maximize total reflections and the optical path in the prism.

11. The apparatus according to claim 1, wherein the lens is a thick, variable-shape lens with a short focal length, and that the prism is provided with a gap filled with a filling agent that has the same refractive index as the prism in order to achieve an optical path corresponding to the focal length of the variable-shape lens and in order to focus the target located at the focal length on the image plane.

12. The apparatus according to claim 1, wherein the lens is a thin, variable-shape lens with a long focal length, and that prism is provided with a gap filled with air that has a different refractive index than the prism in order to achieve a focal length corresponding to the focal length of the variable-shape lens and in order to focus the target located at the focal length on the image plane.

13. The apparatus according to claim 1, wherein it is installed in a portable mobile phone.

14. A method comprising:
   adjusting mechanically a focal length of a lens to correspond to a distance between a target under observation and said lens,
   permanently positioning the lens relative to an image plane,
   permanently positioning a prism relative to the lens and to the image plane,
   adjusting an optical path of the prism to be such that it corresponds to the adjusted focal length of the lens by producing an adjustable number of reflections along the optical through the prism, and forming an image of the target on the image plane.

15. The method according to claim 14, wherein said lens is a variable shape lens and the curvature of the variable-shape lens is changed in order to adjust the focal length of the lens to correspond to the distance of the target under observation.

16. The method according to claim 14, wherein said lens is an elastic variable-shape lens and the diameter of the elastic variable-shape lens is changed in order to adjust the focal length of the lens to correspond to the distance of the target under observation.

17. The method according to claim 14, wherein the shape of a boundary surface of substances of the lens is formed of two mutually non-soluble substances and is changed in order to adjust the focal length of the lens to correspond to the distance of the target.

18. The method according to claim 14, wherein the position of crystals contained in the lens contains doubly refracting crystals and is changed in order to adjust the focal length of the lens to correspond to the distance of the target under observation.

19. The method according to claim 14, wherein an electric field is induced in the lens in order to adjust the optical properties of the lens.

20. The method according to claim 14, wherein the optical path of the prism is adjusted by a gap provided in the prism, so that the gap is in turn filled with a filling agent and in turn emptied of the filling agent.

21. The method according to claim 14, wherein the focal length of the lens is adjusted to be short, and that a gap of the prism is filled with a filling agent with a refractive index that is the same as the refractive index of the prism in order to achieve in the prism a focal path that corresponds to the focal length of the lens and to focus the target located at the focal length on the image plane.

22. The method according to claim 14, wherein the focal length of the lens is adjusted to be long, and that a gap of the prism is filled with air that has a different refractive index than the prism in order to achieve, by means of total reflections in the prism, an optical path that corresponds to the focal length of the lens and in order to focus the target located at the focal length on the image plane.

23. A method for manufacturing an optical system comprising:
installing an image plane, on which an image of a target is formed,
installing a lens with a focal length that is mechanically adjustable to correspond to the distance of the target under observation, and permanently positioning the lens relative to said image plane,
installing a prism with an optical path that is adjustable to correspond to the adjusted focal length of the lens, the prism configured to produce an adjustable number of reflections along the optical path through the prism, and permanently positioning the prism relative to the lens and to the image plane.

24. A mobile phone comprising an adjustable optical system, the adjustable optical system comprising:
an image plane, on which there is formed an image of a target observed by the optical system, and
a lens permanently positioned relative to said image plane, with mechanically adjustable focal length,
a prism permanently positioned relative to said image plane and said lens with an optical path that is adjustable so that it corresponds to the focal length determined for the lens by configuring the prism to produce an adjustable number of reflections along the optical path through the prism, so that an image of an observed target is formable on the image plane.

25. The mobile phone according to claim 24, wherein the lens is a variable-shape lens with a curvature that can be changed in order to adjust the focal length of the lens.

26. The mobile phone according to claim 24, wherein the lens is an elastic, variable-shape lens with a diameter that can be changed in order to adjust the focal length of the lens.

27. The mobile phone according to claim 24, wherein the lens made of two materials that are mutually non-soluble, so that the shape of the boundary surface of said materials can be changed in order to adjust the focal length of the lens.

28. The mobile phone according to claim 24, wherein the lens contains doubly retracting crystals, the position of said crystals being changeable in order to adjust the focal length of the lens.

29. The mobile phone according to claim 24, wherein an electric field is to be induced in the lens in order to adjust the optical properties of the lens.

30. The mobile phone according to claim 24, wherein the lens is composed of several elements, at least one of which is a variable-shape lens.

31. The mobile phone according to claim 24, wherein the prism is provided with a gap, and that the system comprises means for filling the gap by a filling agent and for emptying the gap of the filling agent in order to adjust the optical path in the prism.

32. The mobile phone according to claim 31, wherein the gap of the prism is filled with a liquid filling agent with a refractive index that is the same as the refractive index of the prism in order to minimize the optical path in the prism.

33. The mobile phone according to claim 31, wherein the gap of the prism is filled with air as the filling agent in order to maximize total reflections and the optical path in the prism.

34. The mobile phone according to claim 24, wherein the lens is a thick, variable-shape lens with a short focal length, and that the prism is provided with a gap filled with a filling agent that has the same refractive index as the prism in order to achieve an optical path corresponding to the focal length of the variable-shape lens and in order to focus the target located at the focal length on the image plane.

35. The mobile phone according to claim 24, wherein the lens is a thin, variable-shape lens with a long focal length, and that prism is provided with a gap filled with air that has a different refractive index than the prism in order to achieve a focal length corresponding to the focal length of the variable-shape lens and in order to focus the target located at the focal length on the image plane.

36. An apparatus comprising:
an adjustable optical system, the adjustable optical system comprising:
means for forming an image of a target observed by the optical system on an image plane, and
means, permanently positioned relative to said image plane, for providing an adjustable focal length,
means, permanently positioned relative to said image plane and said means for providing an adjustable focal length, for providing an optical path that is adjustable so that it corresponds to the focal length determined for the means for providing an adjustable focal length, so that an image of an observed target is formable on the image plane.

\* \* \* \* \*

UNITED STATES PATENT AND TRADEMARK OFFICE
CERTIFICATE OF CORRECTION

PATENT NO. : 7,542,214 B2
APPLICATION NO. : 10/557451
DATED : June 2, 2009
INVENTOR(S) : Levola

Page 1 of 1

It is certified that error appears in the above-identified patent and that said Letters Patent is hereby corrected as shown below:

At column 11, line 2, claim 14, line 12, please insert the word --path-- after the word "optical".

Signed and Sealed this

Eighth Day of September, 2009

David J. Kappos
*Director of the United States Patent and Trademark Office*